(12) United States Patent
Nielsen et al.

(10) Patent No.: US 7,853,361 B2
(45) Date of Patent: Dec. 14, 2010

(54) SYSTEM AND METHOD FOR COMMAND EXECUTION HANDLING

(75) Inventors: Martin Sandal Nielsen, Norre Nebel (DK); Bjarne Ravndal Andreasen, Struer (DK)

(73) Assignee: VKR Holding A/S (DK)

(*) Notice: Subject to any disclaimer, the term of this patent is extended or adjusted under 35 U.S.C. 154(b) by 376 days.

(21) Appl. No.: 11/994,616

(22) PCT Filed: Jul. 4, 2005

(86) PCT No.: PCT/DK2005/000461

§ 371 (c)(1),
(2), (4) Date: Jan. 3, 2008

(87) PCT Pub. No.: WO2007/003184

PCT Pub. Date: Jan. 11, 2007

(65) Prior Publication Data

US 2008/0312754 A1    Dec. 18, 2008

(51) Int. Cl.
  *G01M 1/38*   (2006.01)
  *G05B 13/00*  (2006.01)
  *G05B 15/00*  (2006.01)
  *G05D 23/00*  (2006.01)
  G05B 11/01    (2006.01)
  G08B 29/00    (2006.01)
  G08B 1/08     (2006.01)
  G06F 15/173   (2006.01)

(52) U.S. Cl. .......................... 700/276; 700/19; 700/20; 700/277; 700/278; 340/514; 340/516; 340/539.14; 340/539.26; 709/220; 709/241; 709/244

(58) Field of Classification Search ............. 700/19–20, 700/276–278; 340/506, 514, 516, 539.14, 340/539.26; 709/220, 241, 244
See application file for complete search history.

(56) References Cited

U.S. PATENT DOCUMENTS 4,539,655 A * 9/1985 Trussell et al. .............. 710/100
5,039,851 A * 8/1991 Green et al. ................ 250/207

(Continued)

FOREIGN PATENT DOCUMENTS

DE  100 26 730   12/2001
FR  2 849 935    7/2004

OTHER PUBLICATIONS

International Search Report; PCT/DK2005/000461; Jan. 26, 2006.

*Primary Examiner*—Ramesh B Patel
(74) *Attorney, Agent, or Firm*—Cantor Colburn LLP

(57) ABSTRACT

System and method for controlling at least one device such as for example an operator for a door, a gate, a window, blinds, shutters, a curtain, an awning or a light source including a controllable unit associated with the at least one device and a plurality of nodes for transmitting control signals to the at least one controllable unit. At least one of the control signals includes priority setting indications relating to at least one of a plurality of levels. At least one controllable unit comprises a component configured to register the priority indications and for storing a corresponding entry relating to the plurality of command levels. Further, the controllable unit includes a component configured to perform an evaluation based on the stored entries.

20 Claims, 4 Drawing Sheets

U.S. PATENT DOCUMENTS

| | | | | |
|---|---|---|---|---|
| 5,444,851 A | * | 8/1995 | Woest | 709/222 |
| 5,449,987 A | | 9/1995 | McMillan et al. | |
| 5,757,773 A | * | 5/1998 | Tsuji | 370/241 |
| 6,064,949 A | | 5/2000 | Werner et al. | |
| 6,115,713 A | * | 9/2000 | Pascucci et al. | 1/1 |
| 6,574,234 B1 | * | 6/2003 | Myer et al. | 370/462 |
| 6,658,475 B1 | * | 12/2003 | Ueno | 709/229 |
| 7,161,481 B2 | * | 1/2007 | Turner | 340/516 |
| 2004/0070516 A1 | * | 4/2004 | Nielsen | 340/825.72 |
| 2004/0139238 A1 | * | 7/2004 | Luhrs | 710/1 |
| 2005/0285730 A1 | * | 12/2005 | Turner | 340/514 |
| 2008/0108388 A1 | * | 5/2008 | Ebrom et al. | 455/557 |

\* cited by examiner

SYSTEM AND METHOD FOR COMMAND EXECUTION HANDLING

This application claims the priority benefit from the national stage application serial number PCT/DK2005/000461 filed Jul. 4, 2005.

TECHNICAL FIELD OF THE INVENTION

The invention relates to a system and a method for controlling at least one device, the system comprising at least a controllable unit associated with the at least one device and a plurality of nodes for transmitting control signals to the at least one controllable unit.

BRIEF DESCRIPTION OF RELATED ART

In control system including control points, sensors and actuators, such as for example home automation systems, it is of importance to define and establish control rules in order to achieve a control system that fulfils predefined requirements and operates in a consistent way. In order to do this, certain priority requirements are established, e.g. in order to ensure that commands having a higher priority than other ones will be executed immediately and that such commands may prevent lower-prioritized commands from being executed during a certain time period.

Normally, priority levels are arranged in a decreasing manner, e.g. in the order: user security, product or environment protection, user manual control, automatic comfort control. Most home automation technologies are designed in such a manner that when a priority level is activated, all the lower levels are locked.

This may in many instances be suitable, but may not at all times fulfil the needs of the users. In particular, such a solution does not allow a selective approach.

BRIEF SUMMARY OF THE INVENTION

The invention relates to a system for controlling at least one device such as for example an operator for a door, a gate, a window, blinds, shutters, a curtain, an awning or a light source the system comprising at least a controllable unit associated with the at least one device and a plurality of nodes for transmitting control signals to the at least one controllable unit wherein the at least one of the control signals comprises priority indications relating to at least one of a plurality of levels, that the at least one controllable unit comprises a component configured to register the priority setting indications and for storing a corresponding entry relating to the plurality of command levels and a component configured to perform an evaluation based on stored entries.

Hereby, it is achieved that priorities on a plurality of levels and possibly based on input from a plurality of sources may be handled in a logic and consistent manner. Further, it is achieved that a selective mask may be defined for the operation of the controllable units in the system.

In this respect, it is noted that incoming control signals normally are transmitted with a priority, e.g. a priority with which they are intended to be executed. However, some of the signals may also comprise priority setting indications, which for the purpose of this application shall be understood as indications relating to priority settings, e.g. the disablement or enablement of executions at one or more specific levels.

Preferably, the control signals may comprise a time indication for the priority setting indications and wherein the at least one controllable unit may comprise a component configured to establish a corresponding timer function.

Hereby, it is achieved that the selectivity of the system may be arranged in a dynamic manner and that the periods, for which levels may be disabled, may be defined in view of particular needs and requirements.

According to a further advantageous embodiment, the a component configured to register the priority setting indications for storing a corresponding entry may comprise a priority and command level management table related to each of the at least one controllable node.

Hereby, the system may be arranged in an advantageous manner.

Advantageously, the priority and command level management table may comprise an evaluation row, wherein status is specified for each command level, based on an evaluation performed in accordance with a predetermined algorithm.

Hereby, it is obtained that an evaluation result is readily presented and that when the controllable node receives a control signal requiring an actuation, a relatively simple comparison with the evaluation result in the evaluation row need only be performed in order to determine, what action has to be taken.

Advantageously, the predetermined algorithm may involve the designation of disablement for a priority level, if at least one of the entries for the level contains a disablement indication.

Hereby, a relatively uncomplicated manner of providing an evaluation is established, which furthermore results in a well-functioning system.

According to a further advantageous embodiment, for the at least one controllable node a weight factor ($k_n$) may be allocated for each command level, on the basis of which a combined weight is determined for each entry, e.g. each row in a management table.

Hereby, in accordance with a further aspect of the invention, a solution may be provided to the problems that may arise if a table is already filled with entries and an incoming signal, which comprises information relating to priority settings, i.e. priority settings that should be included in the table, is received. In this case, it may be determined that the entry with for example the lowest weight is removed.

According to a still further advantageous embodiment, the at least one controllable node may be configured for deleting an entry if two or more of the entries are disabling at the same level, based on the combined weight for each entry.

Thus, one of two entries that may for most purposes have the same effect, may be deleted, leaving room for a new entry that may have properties very unlike the entries already represented in the table, thus giving possibly new results to the evaluation.

According to a further aspect of the invention, a control signal that is denied at the time of reception caused by the evaluated entries, may be stored for a predetermined time using a separate timer for a subsequent re-evaluation with the entries.

Thus, the possibility that one of the entries in the table are near the end of the timer function may be used in such instances.

The invention also relates to a method of operating a device such as for example an operator for a door, a gate, a window, blinds, shutters, a curtain, an awning or a light source, which device is associated with a controllable unit, the controllable unit being designed for receiving control signals from a plurality of nodes in a control system and activating the device in accordance with the control signals, whereby at least one of the control signals comprises priority indications relating to at least one of a plurality of levels, whereby the controllable unit registers and stores the priority setting indications as a corresponding entry when the control signal is received, and whereby the controllable unit performs an evaluation based on the stored entry in the unit and acts in accordance with the evaluation.

Hereby, it is achieved that priorities on a plurality of levels and possibly based on input from a plurality of sources may be handled in a logic and consistent manner. Further, it is achieved that a selective mask may be defined for the operation of the controllable units in the system.

Preferably, the control signals may comprise a time indication for the priority setting indications, and whereby the at least one controllable unit establishes a corresponding timer function.

Hereby, it is achieved that the selectivity of the system may be arranged in a dynamic manner and that the periods, for which levels may be disabled, may be defined in view of particular needs and requirements. Further, it is achieved that in case a node, which has transmitted a priority setting signal, for some reasons may not be able to alter or delete the specific setting, for example because the node has no power source, e.g. a flat battery, or has been removed so far from the system, that contact cannot be established, the specific priority setting will not remain for an unspecified time in the system, but will eventually be removed automatically, when the timer lapses.

According to a further advantageous embodiment, the entries may be stored in a priority and command level management table related to the at least one controllable node.

Hereby, the method may be arranged in an advantageous manner

Advantageously, an evaluation may be performed in accordance with a predetermined algorithm for each level and the result may be specified for each command level in an evaluation row for the priority and command level management table.

Hereby, it is obtained that an evaluation result is readily presented and that when the controllable node receives a control signal requiring an actuation, a relatively simple comparison with the evaluation result in the evaluation row need only be performed in order to determine, what action has to be taken.

Preferably, the predetermined algorithm may involve the designation of disablement for a priority level, if at least one of the entries for the level contains a disablement indication.

Hereby, a relatively uncomplicated manner of providing an evaluation is established, which furthermore results in a well-functioning system.

According to a further advantageous embodiment, for the at least one controllable node a weight factor ($k_n$) may be allocated for each command level and a determination of a combined weight for each entry, e.g. each row in a management table, is performed.

Hereby, in accordance with a further aspect of the invention, a solution may be provided to the problems that may arise if a table is already filled with entries and an incoming signal is received. In this case, it may be determined that the entry with for example the lowest weight is removed.

Advantageously, an entry may be deleted, if two or more of the entries are disabling at the same level, based on the combined weight for each entry.

Thus, one of two entries that may for most purposes have the same effect, may be deleted, leaving room for a new entry that may have properties very unlike the entries already represented in the table, thus giving possibly new results to the evaluation.

According to a further advantageous embodiment, a control signal that is denied at the time of reception caused by the evaluated entries, may be stored for a predetermined time using a separate timer for a subsequent re-evaluation with the entries.

Thus, the possibility that one of the entries in the table are near the end of the timer function may be used in such instances.

BRIEF DESCRIPTION OF THE FIGURES

The invention will be explained in further detail below with reference to the figures of which

DETAILED DESCRIPTION OF THE INVENTION

Figure 1:
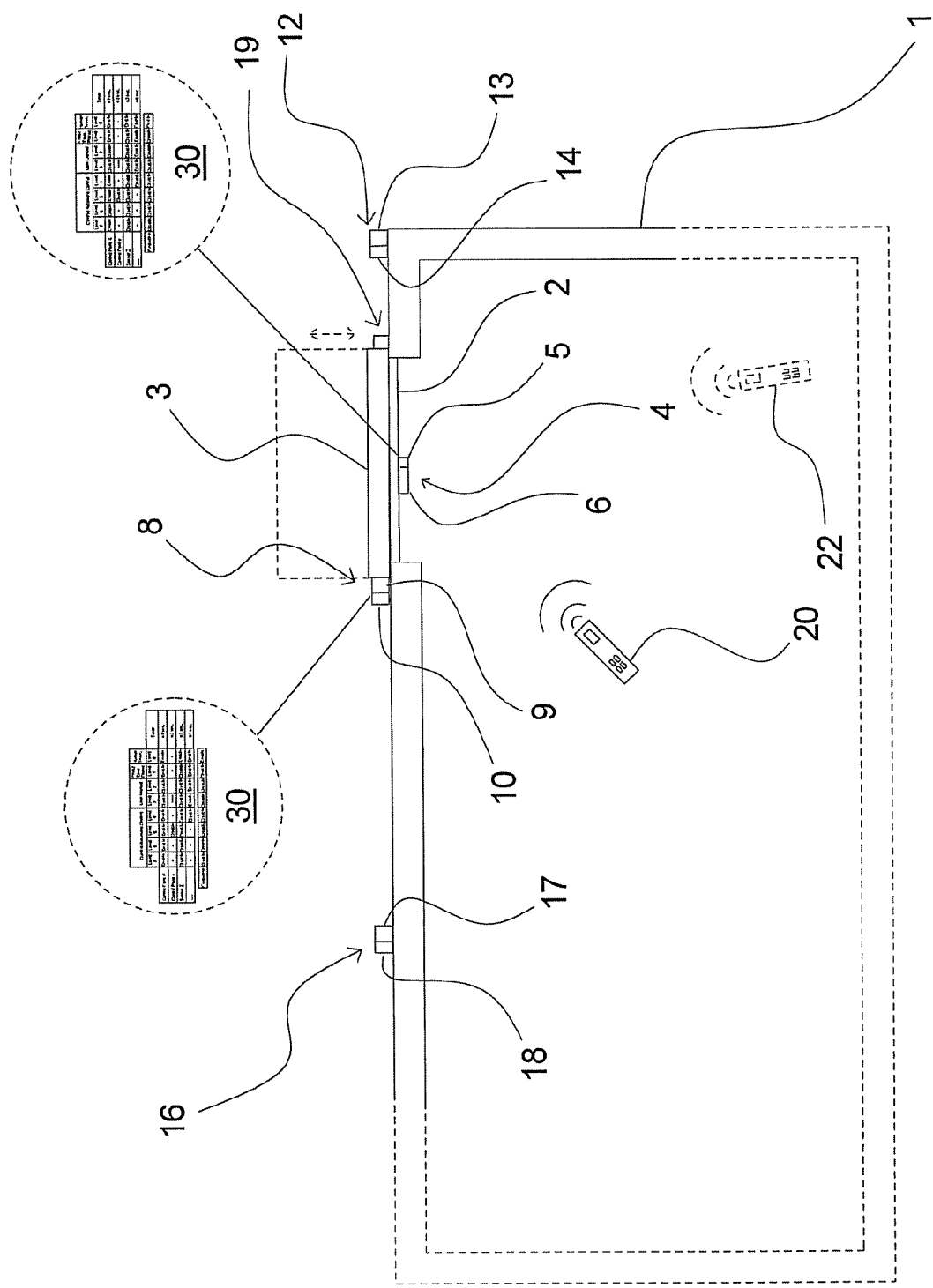
FIG. 1 shows in a schematic manner an example of a control system in accordance with the invention.

An example of a control system according to an embodiment of the invention, e.g. a home automation system or part thereof, is illustrated in FIG. 1. Here, a building, a house or the like 1 is illustrated in a schematic manner, showing in detail only a part of the house or a room where a window 2 is located. The window 2 may be provided with a window actuator, operator or opener 4, which may comprise a drive mechanism generally designated 6 and a controllable node 5, e.g. a node comprising a radiofrequency receiver and control. Further, the window 2 may be provided with an awning 3, which is retractable as indicated, operated by an operator 8. This operator 8 may comprise a drive engine generally designated 9 and a controllable node 10, e.g. a node comprising a radiofrequency receiver and control.

The control system may also comprise one or more sensors such as e.g. a wind speed sensor 12, a sunlight sensor 16 and a rain sensor 19. Such sensors may as indicated comprise a sensor part, e.g. an anemometer 13 and a photometer 17, respectively, and a transmitter part, e.g. 14 and 18, respectively, which transmitter parts may e.g. comprise RF— or may rely on wired transmission. The rain sensor 19 may be integrated with the window 2, but will also comprise a sensor part and a transmitter part (not illustrated). Further sensors or controllers may be provided, also inside the room, for example in the form of a temperature sensor etc.

Further, the control system may comprise one or more remote controls 20 and 22 as shown for operating the controllable devices, e.g. the window opener 4 and the awning 3. These remote controls may be similar, e.g. comprise similar properties, but the may also differ, e.g. have different properties as regards e.g. priority. One, e.g. the remote control 20 may for example be a master control while another, e.g. the remote control 22 may be a slave remote control.

These remote controls 20 and 22 and the sensors 12, 16 and 19 may all transmit control signals to the controllable units, e.g. the controllable nodes 5 and 10, associated with the window 2 and the awning 3, respectively. It will be understood that the terms "control signals" in this respect comprise any signal transmitted from a node such as a sensor or a remote control to a controllable unit, including signals representing measured values etc., and that the controllable unit may or may not react upon such a signal, e.g. in accordance with certain predefined or established rules.

As explained above, it will in most cases be necessary to prioritize the control signals. For example, it may be necessary to arrange that a signal transmitted from a wind sensor to the controllable unit associated with an awning has a higher priority than a signal sent from a remote control, e.g. in order to achieve that the awning is maintained in a retracted position when the force of the wind is above a predetermined level.

In order to manage such priorities, signals from the sensor and control nodes may be provided with priority setting indications at a number of levels, and when these signals are received at the controllable nodes, they are registered and stored in the form of an entry in a table, and an evaluation is performed on the basis of the stored information in the table. On the basis of this evaluation the device associated with the controllable unit is operated, e.g. activated, stalled, stopped, reversed, etc. when a control signal requesting e.g. an actuation is received at the node.

This table is indicated by the symbol 30 shown in FIG. 1 associated with each of the controllable nodes, e.g. the nodes 5 and 10 in this example.

The details of such a table will be further explained with reference to FIG. 2, which shows an example of such a management table 30 for a controllable node or device in a control system.

The priority levels may in accordance with usual practice be arranged in a decreasing way, for example in the following order: Human security, product or environment protection, user manual operation, automatic comfort control. A number of levels may be defined, for example eight levels as shown at 31 in FIG. 2, ranging from the highest level 0 to the lowest level 7, and of these levels the four lowest may be designated to comfort automatic control levels, levels 3 and 2 may be designated to user manual control, while levels 1 and 0 thus are designated for product or environment protection and human security, respectively.

Figure 2:
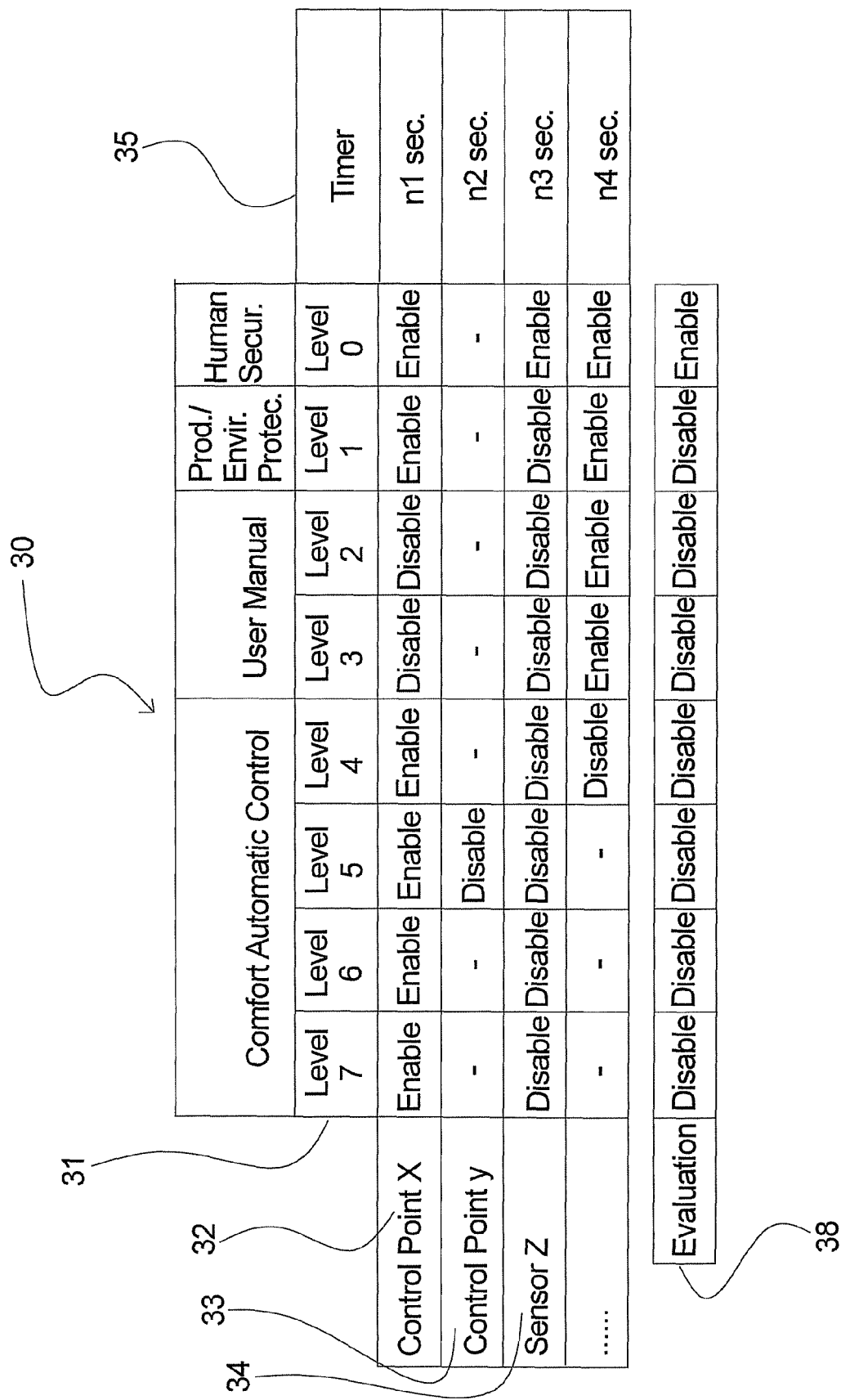
FIG. 2 shows an example of a priority and command level management table in accordance with an embodiment of the invention.

When a signal is received from a node, the content of this signal that relates to priority or priorities on certain command levels leads to the storing of an entry in a management table as shown in FIG. 2. Here, each row e.g. 32, 33, 34 corresponds to a signal transmitted from a node to the specific controllable node, and it will be understood that each controllable node comprises such a management table. For each command the table may comprise a priority, e.g. "enable" or "disable" that will lead to a corresponding setting in the table. If the received signal does not specify "enable" or "disable" for a priority level, the evaluation will not be influenced by the signal on this level. Thus, the entry for such a signal at such a level may be e.g. "enable", if the evaluation rule specifies that the result should be "enable", unless at least one "disable" is present.

Further, the control signal may also indicate a period of time, in which the entry must be stored in the table, for example 15 minutes from receipt of the command. Thus, the table will also contain a column 35 indicating a timer operation, e.g. indicating the total time period for the entry in question or the remaining time for the entry. It is obvious that the controllable nodes comprise a timer for managing the table 30.

Further, it is noted that if a command signal is received, e.g. a signal requesting an actuation that cannot be executed because the specific level is locked, when the signal is received, the command signal may be saved for a specific period, e.g. 10 minutes, facilitated by a separate timer. The signal may be handled again at the lapse of the 10 minutes period, but preferably it is handled continuously during the period, e.g. in order to have the command executed as fast as a blocking has been removed from the table. If the priority level is still locked at the lapse of the period, the command signal may then be discarded.

When the table is established and when a new command comprising priority indications is received, an entry is made in the table, the table is evaluated and the result is registered in the evaluation row 38. Different rules and algorithms may be used for performing the evaluation. For example as shown in FIG. 2, for each level it is indicated that a command level is disabled when it contains at least one "disable" priority. Another manner of evaluating the table could for instance be to evaluate based on a majority. It is obvious that the manner of evaluating may differ from node to node, for example in dependence on the type of device that is associated with the controllable node.

An incoming new command signal that contains a command on a level, that is disabled, cannot be executed, whereas a command on a level that is not disabled can be executed.

Further, it is noted that if the level "0", i.e. Human Security is disabled, it may be arranged that all lower levels will also be disabled in order to ensure the human protection.

As mentioned, the evaluation is performed each time a new command signal comprising priority setting indications is received, but when a command is removed from the table because the time period has lapsed, the evaluation may also be re-evaluated. Further, it will be understood that the table may be re-evaluated with regular intervals.

Figure 3:
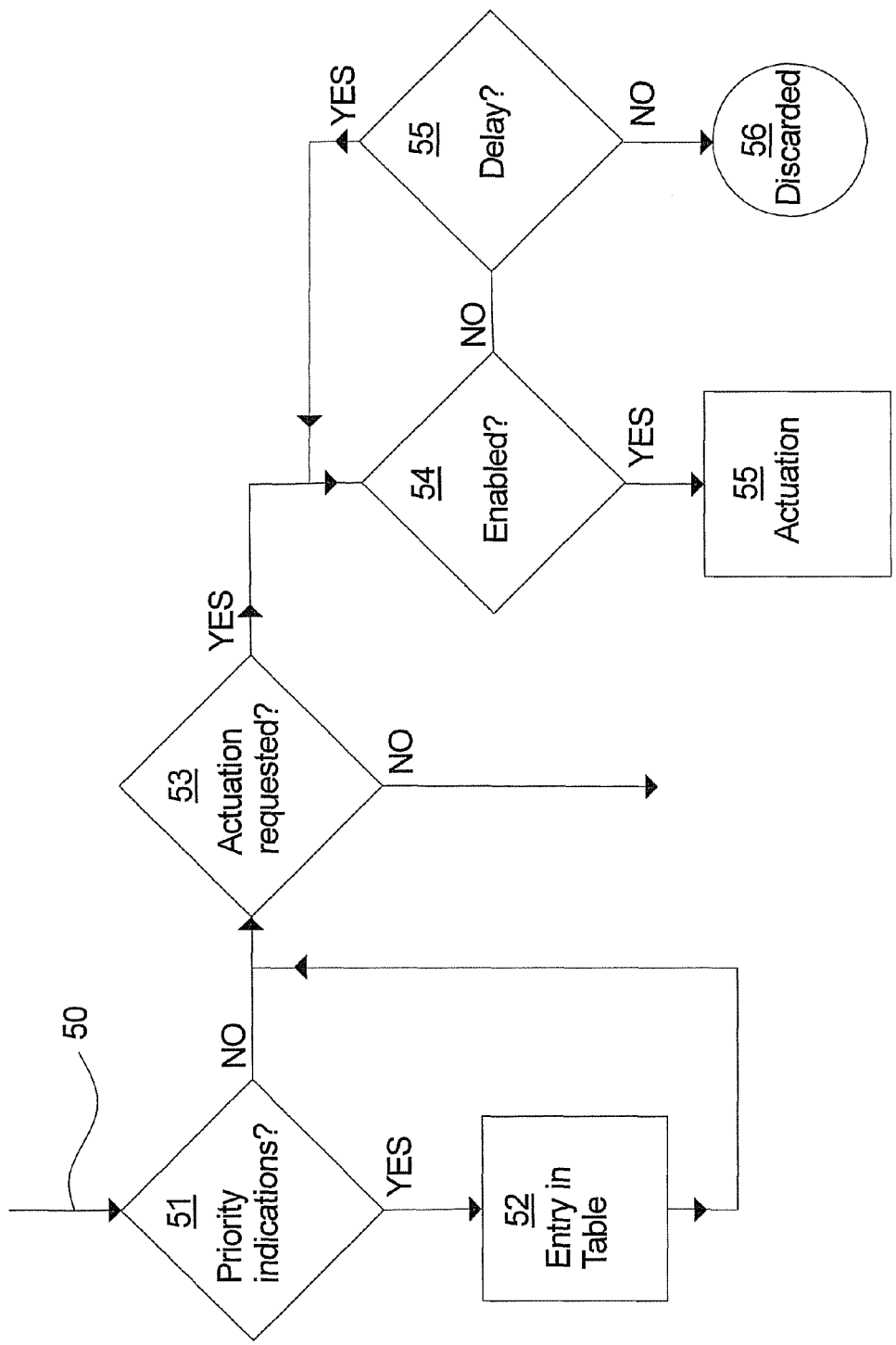
FIG. 3 illustrates an example of the processing of an incoming signal.

The manner in which an incoming signal is handled may be exemplified with reference to FIG. 3. Here, an incoming control signal 50 may first be examined 51 for any enclosed information regarding prioritizing. If the signal contains such information, a corresponding entry at 52 in the management table is performed. If it does not contain such information, it is examined at 53, whether the signal contains any information that will require an actuation. As shown, this may also be performed after the signal has initiated an entry in the management table. If an actuation is requested, it is examined at 54 whether this actuation is enabled or disabled. If it is not disabled, the actuation is performed at 55. If it is disabled, the signal may possibly be pooled for a delay period as shown at 55 for later evaluation in view of the content of the management table. Otherwise the signal is discarded 56.

In the example described above, the signal is examined for any information regarding priority setting(s) before it is examined whether it also request an actuation. However, it may normally be preferable to examine the signal first for a request for an actuation and thereafter for priority setting(s). In this manner, it is avoided that the specific signal may set a priority that may preclude the actuation it is requesting itself.

Each time a control signal is received at the controllable node, the table 30 is updated, e.g. if a timer function has lapsed, the entry is deleted from the table, before the control signal is evaluated in regard to the content of the table.

It will be understood that the table for practical reasons will be limited as regards the number of entries. If a control signal is received that has a content requiring an entry to be made when the table is full, different solutions are possible. The simplest solution is to reject the control signal.

However, other manners of handling such a situation are possible. For example, it may be decided that the entry with the smallest remaining timer value may be excluded etc.

Figure 4:
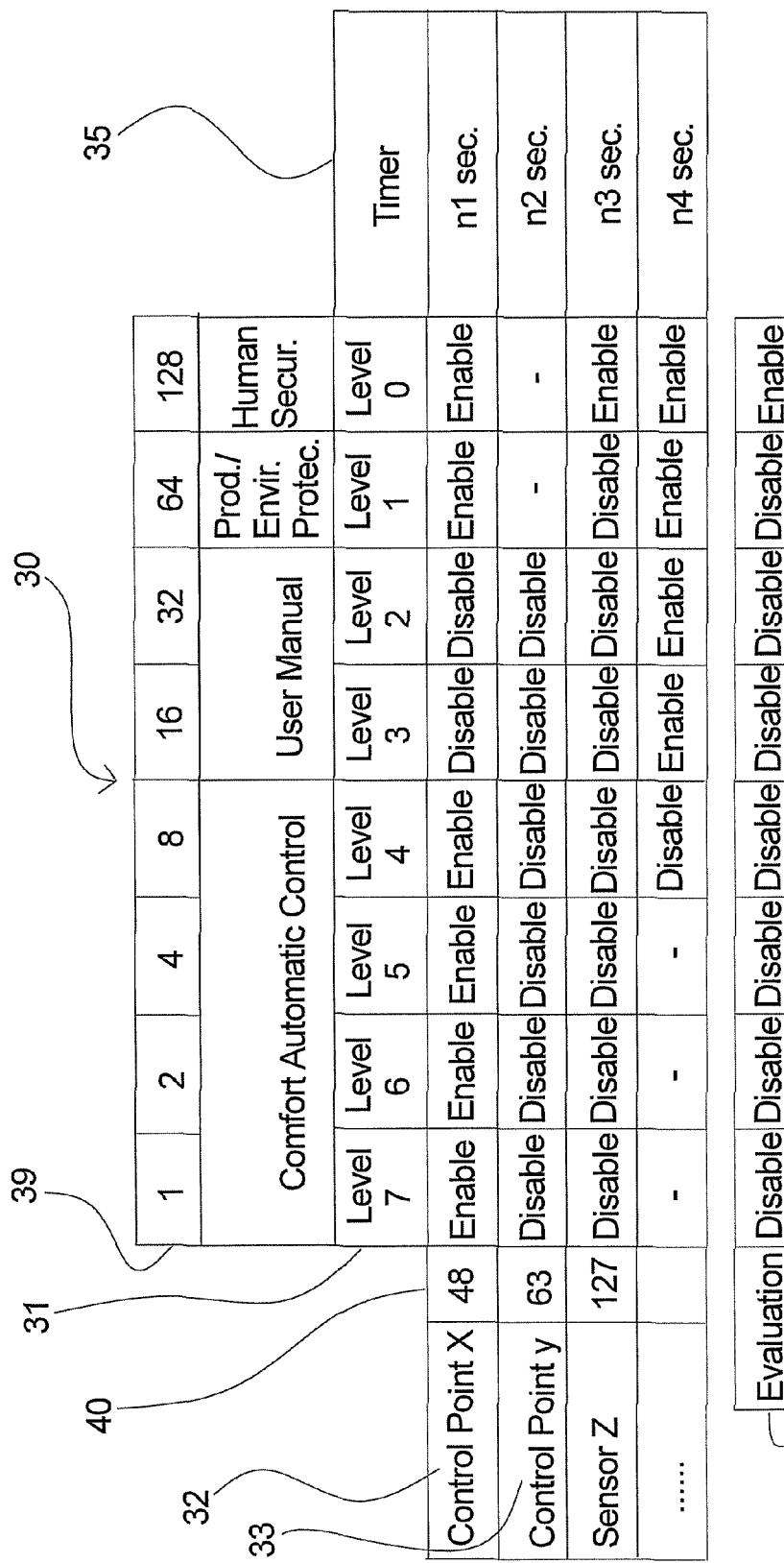
FIG. 4 shows an example of a priority and command level management table in accordance with a further aspect of the invention.

A still further method is illustrated in FIG. 4. Here, a management table 30 corresponding to the one shown in FIG. 2 is illustrated. However, this table comprises a row 39 with weight factors $k_n$ that as shown may be for example 1, 2, 4, 8, 16, 32, 64 and 128 for the respective levels, i.e. $2^n$, but in the reverse order. These weighing factors may be combined with the priority identifications in the respective entries, e.g. by multiplying the factors with the "disable"-entries and summing, which results in the column 40 showing the combined weight of each entry.

If a signal has been received that will lead to an entry, and the table is full, it may be decided that if two entries are locking at the same higher level, e.g. as shown with the entry 32 and 33 that are both locking at level 2, the weight factor may be taken into regard. The entry 32 has the lowest combined weight, and therefore this entry is removed from the table and the new entry is introduced instead.

The shown weight factors are only examples of, what may be used, but in general it preferable that the factors are increased in such a manner that one entry that has only one "disable" at e.g. level m will achieve a higher combined weight than another entry that has "disable" at all levels lower than m. In this manner it is achieved that an entry with the highest "disable"-entry always will be maintained. This is achieved with the rule "$2^n$, but in the reverse order".

It will be understood that the invention is not limited to the particular examples described above and illustrated in the drawings but may be modified in numerous manners and used in a variety of applications within the scope of the invention as specified in the claims.

The invention claimed is:

1. System for controlling at least one device, the system comprising:
   at least a controllable unit associated with said at least one device and;
   a plurality of nodes for transmitting control signals to said at least one controllable unit;
   wherein at least one of said control signals comprises priority setting indications relating to at least one of a plurality of command levels,
   wherein said at least one controllable unit comprises a component configured to register said priority indications and to store a corresponding entry relating to said plurality of command levels, and a component configured to for perform an evaluation based on stored entries so as to operate at least one of said at least one device,
   wherein said component for registering said priority indications and storing a corresponding entry comprises a priority and command level management table related to each of said at least one controllable node.

2. System according to claim 1, wherein said control signals comprise a time indication for said priority setting indications and wherein the at least one controllable unit is configured to establish a corresponding timer function.

3. System according to claim 1, wherein said priority and command level management table comprises an evaluation row, wherein status is specified for each command level, based on an evaluation performed in accordance with a predetermined algorithm.

4. System according to claim 3, wherein said predetermined algorithm involves designation of disablement for a priority level, if at least one entries for said level contains a disablement indication.

5. System according to claim 1, wherein for said at least one controllable node a weight factor is allocated for each command level, on the basis of which a combined weight is determined for each entry in a management table.

6. System according to claim 5, wherein said at least one controllable node is configured for deleting an entry if two or more of said entries are disabling at the same level, based on the combined weight for each entry.

7. System according to claim 1, wherein a control signal comprising a command received at said at least one controllable unit is examined as regards priority level and the command is executed or denied in view of said evaluated entries.

8. System according to claim 7, wherein said command is executed, if the specific priority level of said priority and command level management table is enabled and wherein said command is not executed, if the specific priority level of said priority and command level management table is disabled.

9. System according to claim 1, wherein a control signal that is denied at the time of reception caused by the evaluated entries, can be stored for a predetermined time using a separate timer for a subsequent re-evaluation with the entries.

10. System according to claim 1, wherein said at least one device is an operator for a door, a gate, a window, blinds, shutters, a curtain, an awning or a light source.

11. Method of operating a device associated with a controllable unit, the controllable unit being configured for receiving control signals from a plurality of nodes in a control system and activating the device in accordance with said control signals, wherein:
   at least one of said control signals comprises priority setting indications relating to at least one of a plurality of levels, the method comprising
   registering and storing said priority indications as a corresponding entry in said controllable unit when said control signal is received, said storing of said entry occurring in a priority and command level management table related to said at least one controllable node, and
   performing an evaluation based on said stored entry in said controllable unit and acting in accordance with said evaluation to operate the device.

12. Method according to claim 11, whereby said control signals comprise a time indication for said priority setting indications, and whereby the at least one controllable unit establishes a corresponding timer function.

13. Method according to claim 11, whereby an evaluation is performed in accordance with a predetermined algorithm for each level and the result is specified for each command level in an evaluation row for said priority and command level management table.

14. Method according to claim 13, whereby said predetermined algorithm involves designation of disablement for a priority level, if at least one of the entries for said level contains a disablement indication.

15. Method according to claim 11, whereby for said at least one controllable node a weight factor is allocated for each command level and a determination of a combined weight for each entry is performed.

16. Method according to claim 15, whereby an entry is deleted, if two or more of said entries are disabling at the same level, based on the combined weight for each entry.

17. Method according to claim 11, whereby a control signal comprising a command received at said at least one controllable unit is examined as regards priority level and the command is executed or denied in view of said evaluated entries.

18. Method according to claim 17, whereby said command is executed, if the specific priority level of said priority and command level management table is enabled and wherein said command is not executed, if the specific priority level of said priority and command level management table is disabled.

19. Method according to claim 11, whereby a control signal that is denied at the time of reception caused by the evaluated entries, is stored for a predetermined time using a separate timer for a subsequent re-evaluation with the entries.

20. Method according to claim 11, wherein said device is an operator for a door, a gate, a window, blinds, shutters, a curtain, an awning or a light source.

* * * * *